United States Patent
Kunz

(10) Patent No.: US 7,644,316 B2
(45) Date of Patent: Jan. 5, 2010

(54) SYSTEM, METHOD AND PROGRAM FOR MANAGING BROWSER SCRIPTS SENT FROM SERVER TO CLIENT

(75) Inventor: James R. Kunz, Maine, NY (US)

(73) Assignee: International Business Machines Corporation, Armonk, NY (US)

( * ) Notice: Subject to any disclaimer, the term of this patent is extended or adjusted under 35 U.S.C. 154(b) by 432 days.

(21) Appl. No.: 11/557,535

(22) Filed: Nov. 8, 2006

(65) Prior Publication Data

US 2008/0109527 A1 May 8, 2008

(51) Int. Cl.
*G06F 11/00* (2006.01)
(52) U.S. Cl. .......................................... 714/38; 717/124
(58) Field of Classification Search .................. 714/38, 714/48; 717/124
See application file for complete search history.

(56) References Cited

U.S. PATENT DOCUMENTS

| | | | | |
|---|---|---|---|---|
| 6,671,818 | B1 * | 12/2003 | Mikurak | 714/4 |
| 7,283,993 | B2 * | 10/2007 | McArdle | 707/3 |
| 2003/0237035 | A1 * | 12/2003 | Bowers et al. | 714/724 |
| 2004/0205721 | A1 * | 10/2004 | Colaiuta | 717/124 |
| 2006/0195745 | A1 * | 8/2006 | Keromytis et al. | 714/741 |
| 2006/0248406 | A1 * | 11/2006 | Qing et al. | 714/38 |

* cited by examiner

*Primary Examiner*—Marc Duncan
(74) *Attorney, Agent, or Firm*—Geraldine D. Monteleone

(57) ABSTRACT

System, method and program for managing a script program sent from a first computer to a second computer. The first computer embeds in the script program an identity of a program module within the first computer that generated the script program. The first computer sends to the second computer the script program with the embedded identity. The second computer attempts to execute the script program and encounters a problem with execution of the script program. In response, the second computer reads the identity of the program module from the script program and notifies the first computer of the problem and the identify of the script program based on the reading of the identity of the program module from the script program. By way of example, the identity of the program module which generated the script program comprises a name of the program module which generated the script program and a name of another program module which called the program module which generated the script program.

9 Claims, 4 Drawing Sheets

SYSTEM, METHOD AND PROGRAM FOR MANAGING BROWSER SCRIPTS SENT FROM SERVER TO CLIENT

FIELD OF THE INVENTION

The invention relates generally to computer systems and networks, and more specifically to management of browser scripts sent from a server computer to a client computer to control a web browser on the client computer.

BACKGROUND OF THE INVENTION

It is well known for server computers to communicate with client computers via the Internet. Client computers typically include web browsers to interface to servers and other computers and devices connected to the Internet. It was known for a server computer to send a script program to a client computer to operate the web browser of the client computer. For example, the server can download both a web page and a script program to the client computer, and the script program can direct the web browser to display a window on the web page.

Occasionally, the script program fails to accomplish its intended function. The following are examples of possible types of failures of the script program: the client computer has insufficient memory to perform the function directed by the script program, the script program attempts to access a window function or method that is not present in the client computer, or the script program attempts to set/write a value for a parameter but only has read access to the parameter. It was known for the web browser to report back to the server any problems with the attempted execution of the script program, for logging and evaluation at the server computer. The web browser can detect the problem either through inherent problem detection code or from "try/catch" code included with the script program. The "try/catch" code is known in Java programming. The "try/catch" code directs the web browser to execute the script program as indicated by the "try" code, and if there is a problem, direct the web browser to notify a server of the problem as indicated by the "catch" code. However, it is often difficult to correlate the script problem report received from the client computer to the server application and server application module that generated the script program, particularly when the server sends script programs to many client computers concurrently. For example, a server program may have many program modules that generate and send the same or similar script program to different client computers. Moreover, some server programs send their script programs to a common program module in the server which then sends the script programs to the client computers. This complicates the process of correlating each script program to the server program module which generated the script program. Moreover, some server programs dynamically generate their script programs, and this further complicates the process of correlating the script program to the server program module which originated it.

Accordingly, a general object of the present invention is to correlate problems with execution of each script program at a client computer with the server program that generated the script program.

Another object of the present invention is to correlate problems with execution of each script program at a client computer with the server program portion that generated the script program.

SUMMARY OF THE INVENTION

The present invention resides in a system, method and program for managing a script program sent from a first computer to a second computer. The first computer embeds in the script program an identity of a program module within the first computer that generated the script program. The first computer sends to the second computer the script program with the embedded identity. The second computer attempts to execute the script program and encounters a problem with execution of the script program. In response, the second computer reads the identity of the program module from the script program and notifies the first computer of the problem and the identify of the script program based on the reading of the identity of the program module from the script program. By way of example, the identity of the program module which generated the script program comprises a name of the program module which generated the script program and a name of another program module which called the program module which generated the script program.

According to a feature of the present invention, the identity of the program module which generated said script program also comprises a name and line number of the other program module which line number was the call to the program module which generated the script program.

DETAILED DESCRIPTION OF THE PREFERRED EMBODIMENTS

Figure 1:
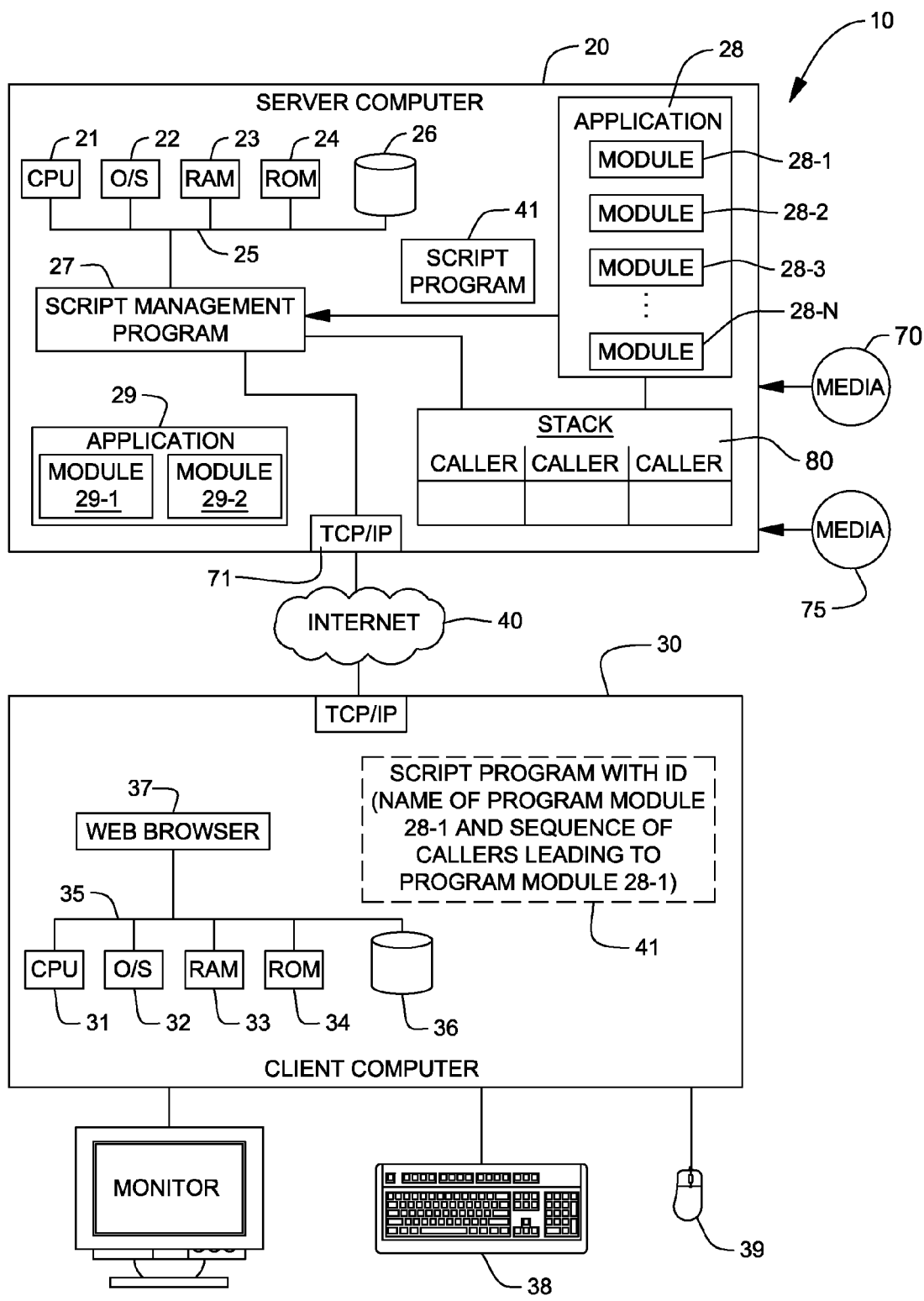
FIG. 1 is a block diagram of a distributed computer system, including a script management program within a server, according to the present invention.

The present invention will now be described in detail with reference to the figures. FIG. 1 illustrates a distributed computer system, generally designated 10 which includes the present invention. System 10 includes a server computer 20 with a known CPU 21, operating system 22, RAM 23 and ROM 24 on a common bus 25 and storage 26. System 10 also includes a client computer 30 with a known CPU 31, operating system 32, RAM 33 and ROM 34 on a common bus 35 and storage 36. Client computer 30 is coupled to server computer 20 via Internet 40 for bilateral communication. Client computer 30 also includes a known web browser 37 such as Microsoft Internet Explorer web browser for interfacing to server computer 20 (and other web servers on Internet 40). Web browser 37 can be operated by a person via a keyboard 38 and a mouse 39, or by a browser script program 41 (downloaded from server 20) which simulates manual input via keyboard 38 and mouse 39.

Server computer 20 also includes one or more applications such as application 28 according to the present invention. Application 28 comprises a multiplicity of program modules 28-1, 28-2, 28-3 . . . 28-N, i.e. blocks of program code that typically perform one or more specific functions, such as accessing a backend database or otherwise fetching data to generate a web page to download to client computer 30. In addition, program modules 28-1. 28-2 and 28-3 generate script programs (such as JAVA script programs) for execution at client computer 30 to control web browser 37 at the client computer. The following are examples of functions of such browser script programs: creating a pop-up window on the web browser display for the web page downloaded by the server 20, opening a new window on the web browser display for the web page downloaded by the server 20, or displaying information on the web browser display relating to the web page downloaded by the server 20. A script program can be one to many lines of web browser input commands.

Server computer 20 also includes a script management program 27 according to the present invention. Program 27 can be separate from application 28 or can be another program module within application 28. If there are multiple programs within server 20 that generate browser script programs, it may be more efficient to have a single instance of program 27 as a script management program separate from the programs that generate the browser script programs. This single instance of program 27 will provide the script management function for all of the programs that generate browser script programs within server 20. As application 28 executes, one or more of the program module 28-1 to 28-N generate and send a script program to script management program 27. In one embodiment of the present invention, when sending the script program to script management program 27, the program module within application 28 which generated the script program includes with the script program, as a string of non executable data, an identification of the program module that generated the script program. In the illustrated embodiment, the identification of the script program that generated the script program comprises a sequence of callers leading to the program module that generated the script program. Optionally, the script program identification comprises only a predetermined number of callers in the sequence leading to generation of the script program. The identification of the script program can come from information stored in the "stack" 80 for server 20. In the "stack", each caller/call in the sequence is identified by program module name, method name (i.e. the specific function within the module) and line number within the program module which called the next program module in the sequence. In this embodiment of the present invention, the program module that generates the script program accesses the "stack" to identify the sequence of callers that lead to its generation of the script program. In another embodiment of the present invention, the program module that generated the script program furnishes the script program but not the identification of the script program to program 27. However, when program 27 receives the script program from the program module as a call (either when program 27 is separate from application 28 or when program 27 is another program module within program 28), program 27 can access the stack to identify the sequence of callers that lead to generation of the script. This sequence will include as the prior entry the program module that generated the script program. After receiving the script program from the program module that generated the script program, program 27 embeds in the script program, as non executable data, the identification of the program module that generated the script program and then sends the script program to the client computer. (As noted above, the identification of the program module that generated the script program may comprise multiple callers/other program modules in a sequence that lead to the program module that generated the script program.) For example, a sequence of program module execution can first be execution of program module 29-1 of application 29, then program module 29-1 calls program module 29-2, then execution of program module 29-2 of application 29, then program module 29-2 calls program module 28-1 of application 28, and then execution of program module 28-1 of application 28, wherein program module 28-1 generates the browser script program. In such a case, the identification of program module 28-1 (that will be embedded in the browser script program) may comprise (a) the name of program module 29-1, name of function within 29-1 and line number in program module 29-1 that made the call to program module 29-2, (b) then the name of program module 29-2, name of function within 29-2 and line number in program module 29-2 that made the call to program module 28-1, and (c) then the name of program module 28-1, name of function within 28-1 and line number in program module 28-1 that made the call to program 27.

Next, the script program 41 executes at the client computer to control the web browser 37 at the client computer. Occasionally, there is a problem with the script program at the client computer, such as the following: the client computer has insufficient memory to perform the function of the script program, the script program attempts to access a window function or method that is not present in the client computer, or the script program attempts to set/write a value for a parameter but only has read access to the parameter. The script program may include "try/catch" code as known in Java programming. The "try/catch" code directs the web browser to execute the script program as indicated by the "try" code, and if there is a problem, direct the web browser to notify server 20 of the problem as indicated by the "catch" code. Known web browsers, such as Microsoft Internet Explorer web browser, can also detect and report certain types of problems with execution of browser script program without "try/catch" code. In either case, the web browser will return to the server an error code or other description of the problem, as well as the identification of the program module(s) that originated the script program. The web browser determines the identification of the program module(s) that originated the script program from the identification included in the script program when received from the server computer. (As noted above, the identification of the program module that generated the script program may comprise multiple callers of other program modules in a sequence that lead to the program module that generated the script program.) The server will log the problem and may notify an administrator, depending on the nature of the problem. The administrator can then attempt to correct the problem which is typically at the client computer.

Figure 2:
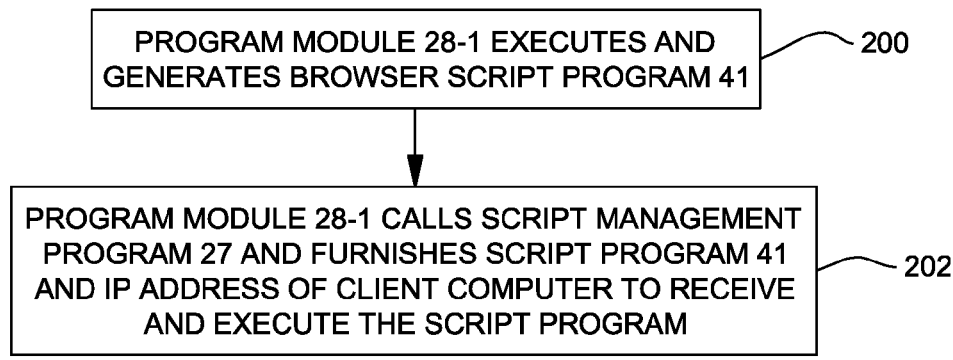
FIG. 2 is a flow chart of program modules within an application program within the server of FIG. 1, which program modules generate browser script programs.

FIG. 2 illustrates the function and operation of program module 28-1 of application 28 in more detail in generating script program 41. The other program modules 28-2 to 28-N function similarly to program module 28-1 in generating a script program, although the functions of program modules 28-2 to 28-N and the script programs they generate may be different from the function of script program 28-1 and the script program it generates.

In step 200, program module 28-1 executes, and during the course of execution, generates a script program 41 to control web browser 37 at client computer 30. Program 28-1 can either generate the script program dynamically or generate it by fetching it from a file. Next, program module 28-1 calls script management program 27 and furnishes the script program 41 and the IP address of client computer 30 to receive the script program (step 202).

Figure 3:
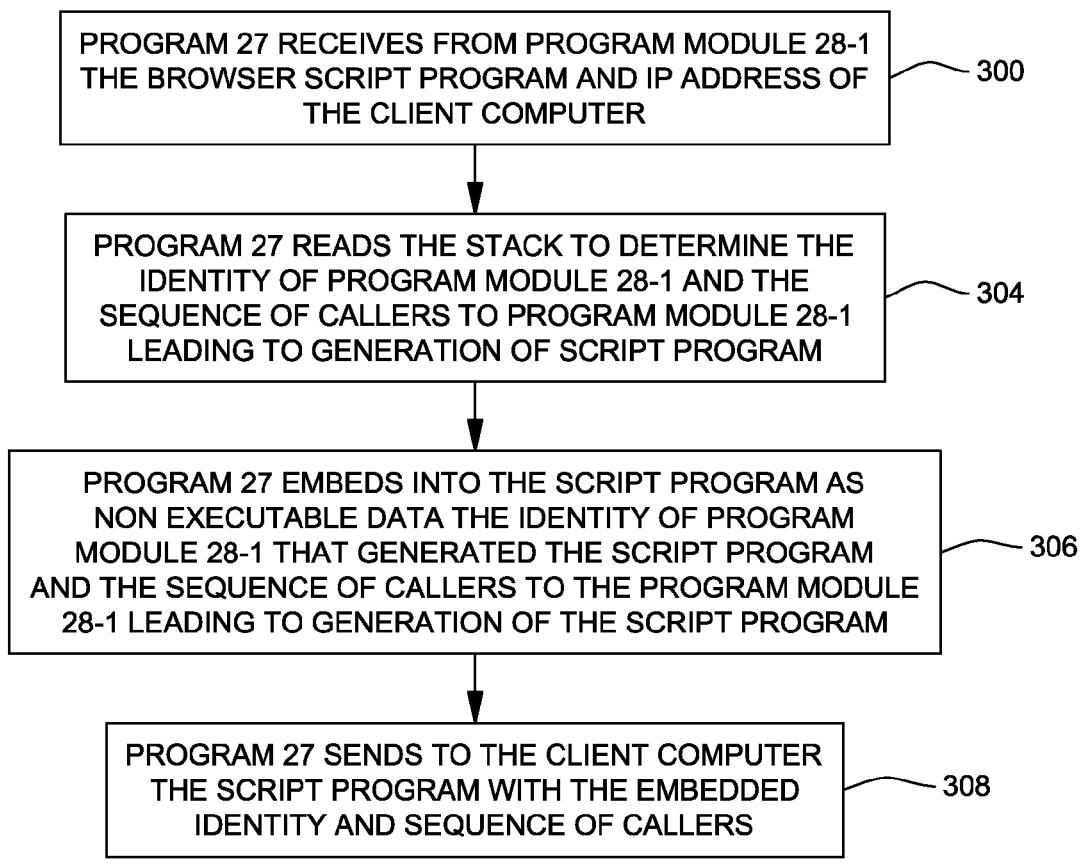
FIG. 3 is a flow chart of the script management program of FIG. 1.

FIG. 3 illustrates the function and operation of script management program 27 in response to receipt of the script program from program module 28-1. (Program 27 operates similarly in response to receipt of script programs from other program modules 28-2 to 28-N.) In step 300, program 27 receives from program module 28-1 the script program 39 and IP address of client computer 30. Next, program 27 reads the "stack" to determine the sequence of callers (and respective program module line numbers in which the call was made) that that lead to execution of program module 28-1 and its generation of the script program (step 304). Next, program 27 adds the identity of the program module 28-1 that generated the script program to the script program 40 as a non executable data string in the script program (step 306). In the illustrated embodiment, the identity of program module 28-1 comprises the name of program module 28-1 and the sequence of callers (and optionally, the respective program module line numbers of the callers in which the call was made) that that lead to the call to and execution of program module 28-1 and its generation of the script program. Next, program 27 sends the script program with the identity of the program module that generated the script program embedded in the script program, to client computer 30 (step 308).

Figure 4:
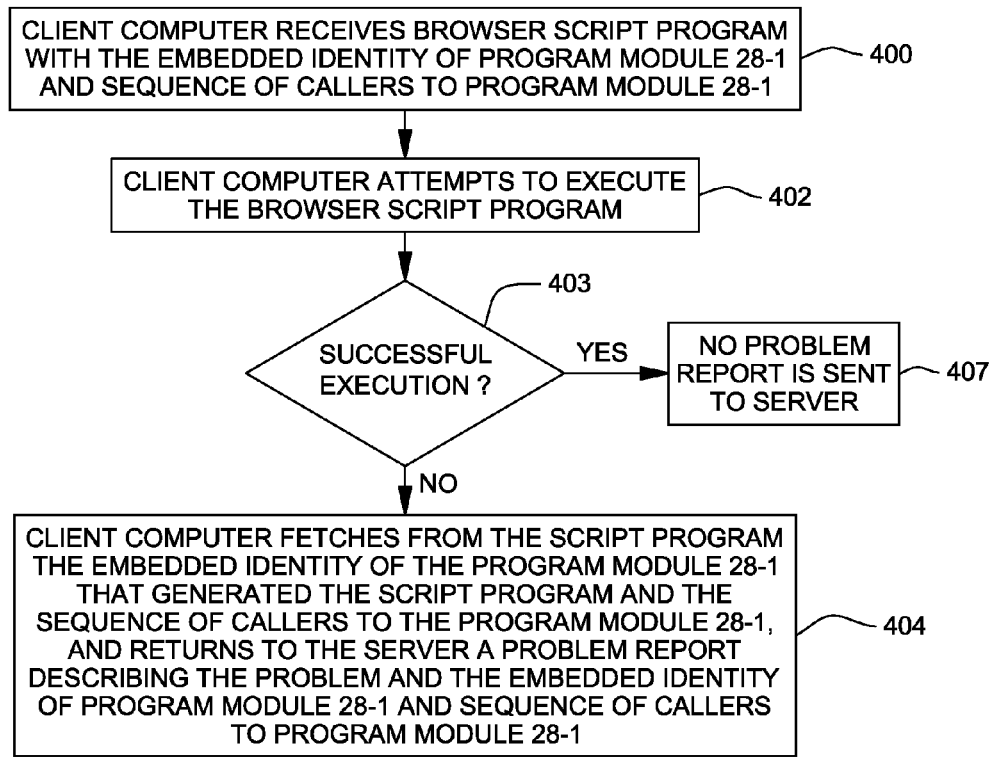
FIG. 4 is a flow chart of operation of a web browser program of a client computer of FIG. 1 responsive to receipt of the script program generated by the server of FIG. 1.

FIG. 4 illustrates the function and operation of the client computer 30 in response to receipt of the browser script program with the identity of the program module that generated the script program. (Client computer 30 operates similarly in response to receipt of script programs generated by other program modules 28-2 to 28-N.) In step 400, client computer 30 receives the browser script program from server computer 20. In response, client computer attempts to execute the script program (step 402). The script program attempts to operate web browser 37. If there is a problem with execution of the script program or operation of web browser 37 (decision 403), web browser 37 returns an error code or other description of the problem to the server along with the identity of the program module 28-1 that generated the script program (step 404). The web browser determines the problem either based on "try/catch" code in the script program or other troubleshooting code resident in the web browser. The web browser determines the identify of the program module 28-1 that generated the script program by reading the non executable data string within the script program 41 that identifies program module 28-1. (If there is no problem with execution of the script program at the client computer 30 (decision 403, yes branch), then no problem report is sent to the server 20 (step 407).)

Figure 5:
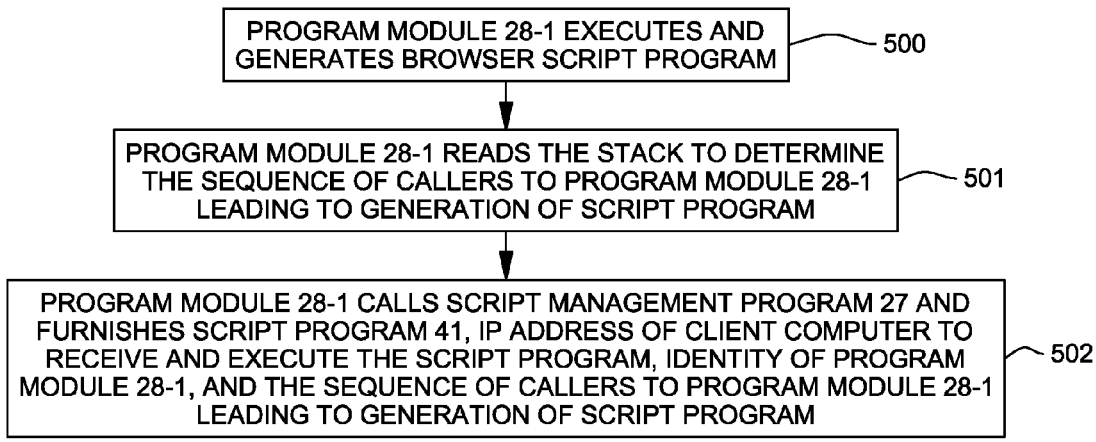
FIG. 5 is a flow chart of program modules within an application program within the server of FIG. 1, which program modules generate browser script program according to another embodiment of the present invention.
Figure 6:
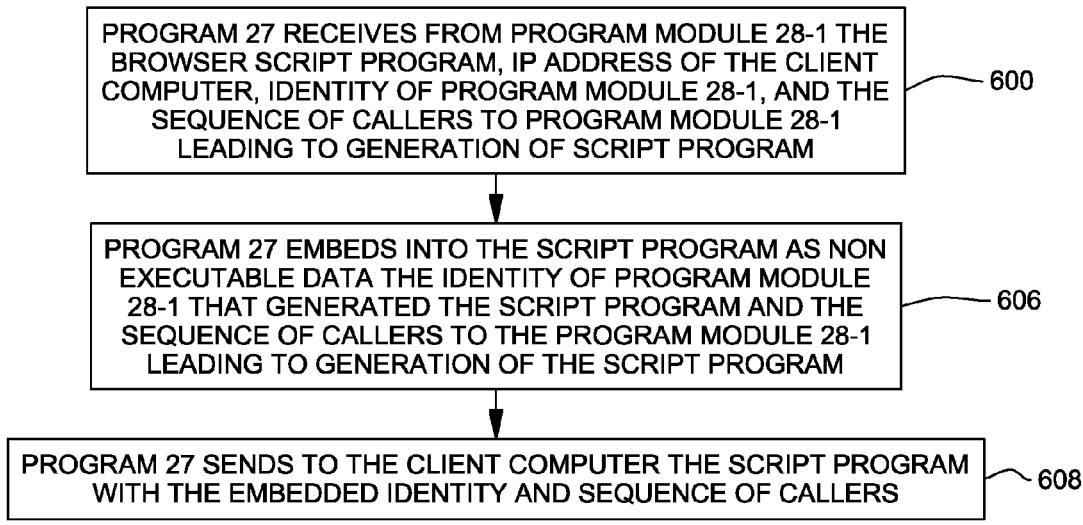
FIG. 6 is a flow chart of the script management program according to the other embodiment of the present invention.
Figure 7:
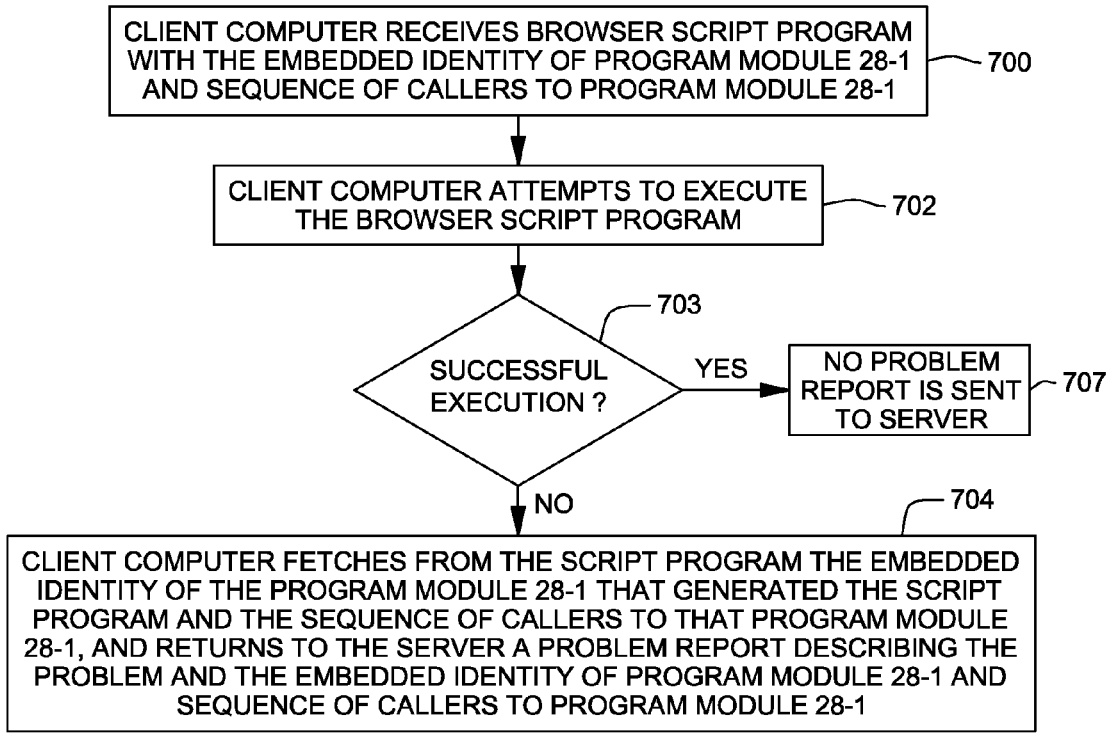
FIG. 7 is a flow chart of operation of a web browser program of a client computer of FIG. 1 responsive to receipt of the script program generated by the server of FIG. 1 according to the other embodiment of the present invention.

FIGS. 5-7 illustrate another embodiment of the present invention in which the program module 28-1 that generates the script program also determines from the stack the sequence of callers leading to the program module 28-1 and generation of the script program. The program module 28-1 then furnishes to program 27 the sequence of callers to program module 28-1, so program 27 obtains this information from program module 28-1 and does not have to read the stack itself to obtain this information.

FIG. 5 illustrates the function and operation of program module 28-1 of application 28 in more detail in generating script program 41 and obtaining the sequence of callers. The other program modules 28-2 to 28-N function similarly to program module 28-1 in generating a script program and obtaining the sequence of callers, although the functions of program modules 28-2 to 28-N and the script programs they generate may be different from the function of script program 28-1 and the script program it generates.

In step 500, program module 28-1 executes, and during the course of execution, generates a script program 41 to control web browser 37 at client computer 30. Program 28-1 can either generate the script program dynamically or generate it by fetching it from a file. Next, program module 28-1 reads the stack to determine the sequence of callers (and optionally, the respective program module line numbers of the callers in which the call was made) that lead to program module 28-1 and the generation of the script program (step 501). Next, program module 28-1 calls script management program 27 and furnishes the script program 41, the IP address of client computer 30 to receive the script program, the name of program module 28-1 and the sequence of callers (and optionally, the respective program module line numbers of the callers in which the call was made) that lead to program module 28-1 and the generation of the script program (step 502).

FIG. 6 illustrates the function and operation of script management program 27 in response to receipt of the script program from program module 28-1. (Program 27 operates similarly in response to receipt of script programs from other program modules 28-2 to 28-N.) In step 600, program 27 receives from program module 28-1 the script program 39, IP address of client computer 30 to receive the script program, the name of program module 28-1 and the sequence of callers (and optionally, the respective program module line numbers of the callers in which the call was made) that lead to program module 28-1 and the generation of the script program. Next, program 27 adds the identity of the program module 28-1 that generated the script program to the script program 40 as a non executable data string in the script program (step 306). In the illustrated embodiment, the identity of program module 28-1 comprises the name of program module 28-1 and the sequence of callers (and optionally, the respective program module line numbers of the callers in which the call was made) that that lead to the call to and execution of program module 28-1 and its generation of the script program. Next, program 27 sends the script program with the identity of the program module that generated the script program embedded in the script program, to client computer 30 (step 608).

FIG. 7 illustrates the function and operation of the client computer 30 in response to receipt of the browser script program with the identity of the program module that generated the script program. (Client computer 30 operates similarly in response to receipt of script programs generated by other program modules 28-2 to 28-N.) In step 700, client computer 30 receives the browser script program from server computer 20. In response, client computer attempts to execute the script program (step 702). The script program attempts to operate web browser 37. If there is a problem with execution of the script program or operation of web browser 37 (decision 703), web browser 37 returns an error code or other description of the problem to the server along with the identity of the program module 28-1 that generated the script program (step 704). The web browser determines the problem either based on "try/catch" code in the script program or other troubleshooting code resident in the web browser. The web browser determines the identify of the program module 28-1 that generated the script program by reading the non executable data string within the script program 41 that identifies program module 28-1. (If there is no problem with execution of the script program at the client computer 30 (decision 703, yes branch), then no problem report is sent to the server 20 (step 707).)

Program 27 can be loaded into server 20 from a computer readable media 70 such as magnetic tape or disk, optical media, DVD, memory stick, or semiconductor memory or downloaded from the Internet 40 via a TCP/IP adapter card 71.

Application 28 can be loaded into server 20 from a computer readable media 75 such as magnetic tape or disk, optical media, DVD, memory stick, or semiconductor memory or downloaded from the Internet 40 via a TCP/IP adapter card 71.

Based on the foregoing, a computer system, method and program for managing script programs have been disclosed. However, numerous modifications and substitutions can be made without deviating from the scope of the present invention. For example, the identity of the program module could be kept on the server indexed by a unique key, such as a time stamp, and instead of sending the actual program identity to the client with the script, the key could be sent instead. Then when the client script subsequently reports a script error to the server, it returns the key, and the server uses the key to look up the identity of the program module. Therefore, the present invention has been disclosed by way of example, and not limitation, and reference should be made to the following claims to determine the scope of the present invention.

What is claimed:

1. A method for managing a script program sent from a first computer to a second computer, said method comprising the steps of:
    said first computer embedding in said script program an identity of a program module within said first computer that generated said script program;
    said first computer sending to said second computer said script program with said embedded identity; and
    said second computer attempting to execute said script program and encountering a problem with execution of said script program, and in response, reading the identity of said program module from said script program and notifying said first computer of said problem and the identity of said script program based on the reading of the identity of said program module from said script program.

2. A method as set forth in claim 1 wherein said identity of said program module which generated said script program comprises a name of said program module which generated said script program and a name of another program module which called said program module which generated said script program.

3. A method as set forth in claim 1 wherein said identity of said program module which generated said script program comprises a name of said program module which generated said script program, a name of another program module which called said program module which generated said script program and a name and line number of said other program module which line number was the call to said program module which generated said script program.

4. A system for managing a script program sent from a first computer to a second computer, said system comprising:
    means, within said first computer, for embedding in said script program an identity of a program module within said first computer that generated said script program;
    means, within said first computer, for sending to said second computer said script program with said embedded identity; and
    means, within said second computer, for attempting to execute said script program and encountering a problem with execution of said script program, and in response, reading the identity of said program module from said script program and notifying said first computer of said problem and the identity of said script program based on the reading of the identity of said program module from said script program.

5. A system as set forth in claim 4 wherein said identity of said program module which generated said script program comprises a name of said program module which generated said script program and a name of another program module which called said program module which generated said script program.

6. A system as set forth in claim 4 wherein said identity of said program module which generated said script program comprises a name of said program module which generated said script program, a name of another program module which called said program module which generated said script program and a name and line number of said other program module which line number was the call to said program module which generated said script program.

7. A computer program product for managing a script program sent from a first computer to a second computer, said computer program product comprising:
    first program instructions, for execution within said first computer, to embed in said script program an identity of a program module within said first computer that generated said script program;
    second program instructions, for execution said first computer, to send to said second computer said script program with said embedded identity; and
    third program instructions, for execution within said second computer, to attempt to execute said script program and encountering a problem with execution of said script program, and in response, read the identity of said program module from said script program and notify said first computer of said problem and the identity of said script program based on the reading of the identity of said program module from said script program; and wherein
    said first, second and third program instructions are stored in computer usable memory in functional form.

8. A computer program product as set forth in claim 7 wherein said identity of said program module which generated said script program comprises a name of said program module which generated said script program and a name of another program module which called said program module which generated said script program.

9. A computer program product as set forth in claim 7 wherein said identity of said program module which generated said script program comprises a name of said program module which generated said script program, a name of another program module which called said program module which generated said script program and a name and line number of said other program module which line number was the call to said program module which generated said script program.

* * * * *